Patented Feb. 21, 1939

2,148,100

UNITED STATES PATENT OFFICE 2,148,100

TREATMENT OF MILK FLUIDS

Edwin H. Browne, Columbus, Ohio, assignor to M & R Dietetic Laboratories, Inc., a corporation of Ohio No Drawing. Application July 1, 1936, Serial No. 88,379

6 Claims. (Cl. 99—212)

This invention relates to a process for the production of organic fluids which are of low bacteria and leucocyte content or substantially sterile, and more particularly to a process for removing bacteria, leucocytes and foreign and cellular débris from such fluids as from milk and liquid milk products and for securing in the products a high degree of freedom from bacteria.

Market milk and milk fluids, as received by dairies, gathering stations and the like normally contain bacteria, leucocytes and foreign or cellular débris in varying amounts depending upon the source of the milk. The conventional methods of pasteurization do not remove all of the bacteria, as the average bacterial count of pasteurized milk runs about 5,000 to 15,000 bacteria per cc. (U. S. Public Health Service, standard plate count method). Furthermore, the conventional pasteurization methods employed do not appreciably reduce the amounts of leucocytes and epithelial cells, or remove foreign and cellular débris, such as the mucoid material derived from colostrum, strippings, and slightly diseased udders, which are normally found in market milk in greater or less amount. Obviously, the retention of bacteria, leucocytes, and such foreign and cellular débris in milk, and milk products, especially when used for dietary purposes, is objectionable and greater cleanliness and a higher degree of sterility in so important a group of food products are greatly to be desired.

It has now been discovered that the bacteria, leucocytes, foreign débris and cellular débris normally found in market milk, cream and other milk products, particularly when farm-gathered, can be materially reduced or substantially eliminated by means of a preliminary filtering of the milk fluid as hereinafter set forth, which filtering step may, if desired, be followed by pasteurization to secure a very high degree of freedom from bacteria. This filtering treatment not only substantially reduces or eliminates the bacteria and leucocytes, but also removes foreign and cellular débris of the character hereinbefore referred to. Experiments carried out by applicant have shown that the average decrease in bacteria due to filtering as hereinafter set forth is in the order of 40 to 50% and higher and where the original milk fluids is of high bacterial content, the average bacteria count decrease may be in the order of 70–97% and in some instances to substantially complete sterility; the decrease in leucocytes amounts to 50 to 60% or higher, and foreign and cellular débris are substantially completely removed. The removal of this débris from the raw milk fluid is advantageous from the dietetic and health standpoints. The filtering treatment also markedly increases the efficiency of pasteurization of the raw milk. Milk and milk products which, in accordance with the present invention, are filtered and then pasteurized, are not only greatly reduced in leucocyte and cellular or foreign débris content as compared with milk prepared and pasteurized in the usual manner; but this bacteria content is reduced to an extremely small amount and in many instances the filtered and pasteurized product is entirely free from bacteria and hence sterile. The large decrease in bacteria, leucocyte, and débris content of filtered and pasteurized milk products prepared in accordance with this invention over the usual pasteurized milk products results in a markedly purer product having better keeping qualities and cleaner flavor than can be obtained by the usual pasteurization procedure.

To accomplish this highly effective removal of bacteria, foreign débris and cellular débris from raw milk and milk products, such as skim milk, cream and the like, the milk or milk product is filtered, preferably under pressure and at suitable temperature, through a suitable filter bed formed as hereinafter set forth from any suitable non-adsorbent, granular material, as for example sand, crushed quartz and the like. The foreign and cellular débris of the character hereinbefore referred to, normally found in the raw milk and milk products, particularly when farm-gathered, is caught and collected by the grains of non-adsorbent material; it apparently forms a coating over the surfaces thereof and lodges in the myriad of intercommunicating pores or voids between the grains of the material forming the filter bed. The grains of non-adsorbent material and possibly this coating and filling co-operating therewith effectively prevent, largely or entirely, the passage of the bacteria, foreign and cellular débris and leucocytes through the filter bed. The coating and filling apparently assists, or at least does not for some period of time hinder the grains of non-adsorbent material in catching and filtering out the bacteria, leucocytes, foreign and cellular débris from the raw milk fluid. The effluent, now substantially reduced in bacterial content and substantially free from cellular débris, can be pasteurized in the conventional manner to provide a treated milk especially adapted for dietary purposes, and on pasteurizing closely approaches or attains complete sterility.

As illustrative of the means for accomplishing this high percentage removal of bacteria, leucocytes and foreign and cellular débris from milk fluids, for example from raw milk such as farm-gathered milk, the following example is given.

A suitable filter bed to be employed in carrying out the process embodying my invention may suitably comprise a layer of granular non-adsorbent filter material such as for example, a layer of high silica content sand (98% SiO₂). The depth of the bed as well as the size of the grains constituting the bed may be varied somewhat and I have found that good results are obtained when sand is employed as the filter to a depth in the order of 3 to 6 inches and of a size that will pass a 25 to 30 mesh screen and be retained on a 60 mesh screen. I preferably use a filter bed formed of a mixture of grains of sharp sand of varying size, although lake or beach sand may also be used. Thus the filter bed may comprise a mixture of sand grains of 30 to 60 mesh, approximately 60% of which will pass a 30 mesh screen and be retained on a 40 mesh screen, approximately 30% of which will pass a 40 mesh screen and be retained on a 50 mesh screen and approximately 5-10% of which will be retained on a 60 mesh screen. The filter bed formed of this mixture of sand grains may conveniently be circular in form and have, for example, a diameter of approximately 16 inches, with approximately 200 square inches of surface, for a filtering capacity of 800 to 1600 pounds per square foot per hour at pressures up to 4 to 8 pounds.

In another example of a filter bed, I have obtained excellent results with the use of a mixture of lake sands of a depth of 3-6 inches and of a size that will pass a 25 mesh screen and be retained on a 50 mesh screen. Thus this filter bed may comprise a mixture of sand grains, approximately 75% of which will pass a 25 mesh screen and be retained on a 40 mesh screen and approximately 25% of which will pass a 40 mesh screen and be retained on a 50 mesh screen. This filter may suitably be constructed in the form and with dimensions similar to the filter bed hereinabove described for similar capacities.

In general, satisfactory results are secured if the sand of the filter bed consists largely or entirely of grains from a maximum of 20 to 30 mesh to a minimum of 50 to 60 mesh and with from 50 to 75% of the sand ranging from the larger size to 40 mesh. The depth and cross-section of the filter bed may be varied in accordance with the capacities required; in general the depth should not be less than 3 inches. The filter bed should, of course, be uniform in depth.

The filter bed may be supported in any suitable manner, for example, on a base screen formed from any suitable non-corrodible material, as for example stainless steel, nickel, or the like, having a mesh capable of retaining the smallest particles of sand constituting the filter bed. If desired, a similar screen of non-corrodible material may be placed on the filter bed, after washing thereof, to prevent the passage of the coarser foreign material, dirt and impurities through the filter bed. I have found that a top screen having a 25-60 mesh will accomplish the desired retention of the cellular material and/or impurities thereon and thus prevent the premature clogging of the pores and voids between the grains of sand.

In carrying out the process of this invention, the liquid milk product, as for example raw milk, is percolated or filtered downwardly through the sand bed, preferably under pressure. Preferably the milk is first mildly preheated, as I find that the efficiency and speed of filtration are thereby greatly facilitated. This preliminary heating of the material may suitably be to a temperature in the order of 70° to 75° F., or somewhat higher, but in general should not exceed 100°. The top screen aids in distributing the milk evenly over the sand and at the same time removes the coarser foreign material and dirt frequently found in raw milk. As stated above, these materials would tend to clog the surface and voids of the filter bed and thus render the filter inefficient in a shorter time, if permitted to flow through the filter bed. The foreign and cellular débris of the character hereinbefore referred to, and of course, bacteria and leucocytes present, pass along with the milk through the top screen and enter the filter bed, forming an apparently continuous but permeable membranous substance which appears to coat the surface of the sand and to fill the voids between the grains of the sand, at least adjacent to the top of the filter bed. The milk passing through the top screen is thus forced to pass through this membranous coating before percolating through the grains of sand below it, and deposits additional cellular débris in the voids of the sand bed in its passage. The surfaces of the particles of sand, possibly in conjunction with the layer or coating of foreign and cellular débris, effectively serve to screen or filter out substantially the greater part of the bacteria and leucocytes from the raw milk passing therethrough. The effluent, now freed from the greater part of its original content of bacteria, leucocytes and foreign and cellular débris can be pasteurized in any desired manner, as for example by either the conventional holding or flash method.

After filtration in the manner hereinbefore described, not only is the bacterial and leucocyte content of the milk fluid greatly reduced, but also the fluid is left in a condition in which pasteurization is peculiarly effective in completely or almost completely eliminating the remaining bacteria. Thus milk or milk fluids which have been subjected to filtration as disclosed above and then pasteurized have their bacteria count so greatly reduced as frequently to be sterile; or if not completely sterile, to but a minute fraction of what the count is on pasteurization of the milk by the same manner without the filtration step.

The effects upon bacterial content of filtration and of filtration combined with pasteurization in accordance with the present invention, as compared with the usual procedure of direct pasteurization above is illustrated by the following table:

TABLE I

*Bacteria counts*

| Raw milk per cc. | Filtered raw milk per cc. | Raw milk pasteurized per cc. | Raw milk filtered then pasteurized per cc. |
|---|---|---|---|
| 10,600 | 4,200 | 2,000 | Sterile |
| 32,000 | 15,000 | 2,000 | Sterile |
| 11,000 | 4,300 | 1,200 | Sterile |
| 224,000 | 64,000 | 9,800 | Sterile |
| 800,000 | 36,800 | 8,400 | 500 |

In each case, the pasteurization was carried out by the same procedure, the milk being held at a temperature of 140° to 150° for 30 minutes and then quickly cooled to 40-50° F.

The effect upon the leucocyte count of raw unfiltered milk of the filtration treatment of my invention is shown by the following table in which is given the results of some test runs on milk produced and secured under substantially the same conditions as the first three products in Table I.

TABLE II

*Leucocyte counts*

| Leucocytes per cc. before filtration | Leucocytes per cc. after filtration | Reduction |
|---|---|---|
| | | *Percent* |
| 990,000 | 460,000 | 54 |
| 1,020,000 | 490,000 | 52 |
| 830,000 | 410,000 | 50 |
| 1,200,000 | 500,000 | 59 |

The cell counts were made on the milk before and after filtering and the following method was used:

15 cc. of the milk was centrifuged for 5 minutes at a high speed (1800 R. P. M.). The milk was removed and the sediment thoroughly mixed with 15 cc. of distilled water. Two drops of methylene blue were added to stain the nuclei of the pus cells so as to differentiate them from the fat globules. The solution was then placed on a haemacytometer for counting.

The runs for which the results are set forth in Tables I and II above were made with filters of the character set forth in the illustrative examples in which the depth of the sand bed was in the order of six inches. At the start of the filtering operation, the rate of in-flow of the milk substantially equals the rate of out-flow and the filter hence operates at substantially zero pressure differential. As the flow of milk through the filter is continued, the filter builds up a resistance to the flow which holds the flow to approximately 1100–1500 pounds per square foot per hour under the pressures hereinafter stated. As stated above, the milk is preferably slightly preheated and then forced through the filter under pressure and as shown, the bacterial count of milk filtered in this manner is in all cases greatly reduced, and in cases of higher original bacterial counts, to the extent of 70–97%. The pressures employed may vary and I have found that pressures in the order of 4 to 8 lbs. and particularly 6 lbs. will accomplish the desired bacterial count decrease with the through-puts described. Pressures above 8 lbs. may be employed; however, the pressure should not be too great as unduly high pressures have a tendency to pack the sand and unduly retard the movement of the milk fluid therethrough.

After considerable running time, usually more than three hours, the voids between the grains of sand become somewhat clogged and the rate of flow through the filter is too greatly retarded or excessively high pressures are required to maintain the desired flow. As it is desirable to maintain a high rate of flow along with a maximum efficiency of operation, filtration may then be stopped and the filter bed back-washed by an upwardly directed stream of wash water in order to remove the cellular débris and entrapped bacteria when the pressure necessary to maintain the desired flow becomes excessively high. When back-washing, it is desirable to first remove the top distributing or screen plate. Upon completion of this back-wash, the filter is ready to operate as before to filter milk and liquid milk products at the desired rate and at a maximum efficiency. Of course, the filter, after washing, is sterilized at suitable intervals, suitably by contact with a dilute solution of formaldehyde, which is removed and washed out before the filter is again used.

As set forth above, the material to be treated is first preferably preheated to a temperature of 70° to 75° F.; somewhat higher temperatures may be used, or the filtration may be conducted at lower temperatures or on the material at the temperature at which received. If temperatures above the range indicated are employed, the flow of the material through the filter is good, but there is a slight decrease in the efficiency of bacteria removal; if temperatures below the range are employed, the flow of the material through the filter is somewhat decreased due to the increased viscosity of the material.

Although I have set forth above that the sand employed has a 25 to 60 mesh, it is obvious that sand having in part a larger or smaller mesh may be employed. It is possible to increase the size of the larger particles of the sand to a 20 mesh and thus pass a greater amount of milk per square foot per hour; or to decrease the size of the smaller particles of the sand below the preferred range, in which case a lesser amount of fluid is passed per unit time. It is obvious that variations in the dimensions of the filter and size of sand particles can be made to meet any requirements; however, the sand should not be so fine that the filter will pack and unduly retard the flow, or so coarse that the filter will not operate efficiently.

Although the present invention has been described in the specific examples given above with particular reference to milk, it may be applied also to other milk fluids, such as skim milk, cream and the like. When the milk or milk fluids are to be subjected to further processing steps in which the natural bacterial organisms are called into play, as in cheese and butter making, the use of the filtration step alone in accordance with my invention is particularly advantageous, as it results in marked improvement in the character, flavor and keeping qualities of the products. In other cases, as when the product is to be used for dietary purposes, particularly for infants, or in the manufacture of other products in which the selective action resulting from inoculation with pure cultures of bacteria or other organisms is desired, as in some cheese-making processes or the manufacture of milks of the acidophilus, bulgaricus or yoghurt types, the use of both the filtration and pasteurization steps in accordance with my process results in exceptional products.

In instances where the milk is to be subjected to a homogenizing treatment to adapt it especially for home consumption, the milk, if preliminarily filtered by my process, not only readily lends itself to homogenization by the known processes, but the homogenized milk is free from all sediment or settled impurities even after continued standing and without the need of a clarification treatment as in the prior art. Milk homogenized without this preliminary filtering step develops a dark sediment in the bottles on standing unless the milk is clarified either before or after homogenization. This sediment, which has the appearance of dirt is thought to be the cellular débris of milk which is uniformly dispersed throughout the milk with the fat globules during the homogenization treatment.

It is to be understood that my invention is not limited to the details of the specific examples hereinbefore set forth, except insofar as included in the accompanying claims.

I claim:

1. The method for the reduction of bacteria, leucocytes and foreign and cellular débris in milk fluids which comprises filtering the milk fluid while moderately warm through a bed of sand having a particle size of 25 to 50 mesh of which approximately 75% passes a 25-mesh screen and is retained on a 40-mesh screen and approximately 25% passes a 40-mesh screen and is retained on a 50-mesh screen.

2. The method for the reduction of bacteria, leucocytes and foreign and cellular débris in milk fluids which comprises filtering the milk fluid while moderately warm through a bed of sand having a particle size of 30 to 60 mesh of which approximately 60% passes a 30-mesh screen and is retained on a 40-mesh, approximately 30% passes a 40-mesh screen and is retained on a 50-mesh screen and approximately 5-10% is retained on a 60-mesh screen.

3. The method of purifying and improving milk fluids which comprises passing a raw milk fluid containing its normal content of bacteria, leucocytes and foreign and cellular débris while moderately warm through a bed of fine-grained sand having a particle size of 30 to 60 mesh, of which approximately 60% passes a 30 mesh screen and is retained on a 40 mesh, approximately 30% passes a 40 mesh screen and is retained on a 50 mesh screen, and approximately 5 to 10% is retained on a 60 mesh screen, whereby a reduction in bacteria and leucocytes and removal of foreign and cellular débris is effected and subsequently pasteurizing the milk fluid, whereby remaining bacteria therein are substantially or completely eliminated.

4. The method of purifying and improving milk fluids which comprises passing a raw milk fluid containing its normal content of bacteria, leucocytes, and foreign and cellular débris while moderately warm through a bed of fine-grained sand having a particle size of 25 to 50 mesh, of which approximately 75% passes a 25 mesh screen and is retained on a 40 mesh screen and approximately 25% passes a 40 mesh screen and is retained on a 50 mesh screen, whereby a reduction in bacteria and leucocytes and removal of foreign and cellular débris is effected and subsequently pasteurizing the milk fluid whereby remaining bacteria therein are substantially or completely eliminated.

5. The method of purifying and improving milk fluids which comprises passing a raw milk fluid containing bacteria, leucocytes and foreign and cellular débris while moderately warm through a bed of fine-grained sand having a particle size of 20 to 60 mesh, 50 to 75% thereof ranging from 20 to 40 mesh, whereby a reduction in bacteria and leucocytes and removal of the foreign and cellular débris is effected.

6. The method of purifying and improving milk fluids which comprises passing a raw milk fluid containing bacteria, leucocytes and foreign and cellular débris while moderately warm through a bed of fine-grained sand having a particle size of 20 to 60 mesh, 50 to 75% thereof ranging from 20 to 40 mesh, whereby a reduction in bacteria and leucocytes and removal of the foreign and cellular débris is effected and subsequently pasteurizing the milk fluid whereby the remaining bacteria therein are substantially or completely eliminated.

EDWIN H. BROWNE.